US012769999B2

(12) United States Patent
Hwang et al.

(10) Patent No.: US 12,769,999 B2
(45) Date of Patent: Oct. 20, 2026

(54) APPARATUS AND METHOD FOR NEURAL NETWORK LEARNING USING SYNAPSE BASED ON MULTI ELEMENT

(71) Applicant: POSTECH ACADEMY—INDUSTRY FOUNDATION, Pohang-si (KR)

(72) Inventors: Hyunsang Hwang, Daegu (KR); Wooseok Choi, Hanam-si (KR)

(73) Assignee: POSTECH ACADEMY-INDUSTRY FOUNDATION, Phohang-si (KR)

( * ) Notice: Subject to any disclaimer, the term of this patent is extended or adjusted under 35 U.S.C. 154(b) by 1140 days.

(21) Appl. No.: 17/558,477

(22) Filed: Dec. 21, 2021

(65) Prior Publication Data

US 2022/0351035 A1 Nov. 3, 2022

(30) Foreign Application Priority Data

Apr. 29, 2021 (KR) ........................ 10-2021-0056015

(51) Int. Cl.

| | |
|---|---|
| ***G06N 3/08*** | (2023.01) |
| ***G06N 3/0499*** | (2023.01) |
| ***G06N 3/063*** | (2023.01) |
| ***G06N 3/065*** | (2023.01) |
| ***G06N 3/09*** | (2023.01) |
| ***G06N 5/04*** | (2023.01) |

(52) U.S. Cl.
CPC ............... *G06N 3/08* (2013.01); *G06N 3/063* (2013.01)

(58) Field of Classification Search
CPC ...................................................... G06N 3/065
See application file for complete search history.

(56) References Cited

U.S. PATENT DOCUMENTS

| | | | | |
|---|---|---|---|---|
| 2019/0019081 | A1* | 1/2019 | Kim | G11C 13/0023 |
| 2020/0118001 | A1* | 4/2020 | Boybat Kara | G06N 3/084 |
| 2020/0380369 | A1 | 12/2020 | Case et al. | |
| 2021/0026601 | A1* | 1/2021 | Kobayashi | G11C 11/2259 |

FOREIGN PATENT DOCUMENTS

| | | | |
|---|---|---|---|
| KR | 1020170080441 | A | 7/2017 |
| KR | 10-2019-0007642 | A | 1/2019 |

OTHER PUBLICATIONS

Lim, Suhwan et al; "Adaptive learning rule for hardware-based deep neural networks using electronic synapse devices"; Jul. 2018; Springer Neural Computing and Applications (2019) 31; 8101-8116 (Year: 2018).*

(Continued)

*Primary Examiner* — David Yi
*Assistant Examiner* — Ezra J Baker
(74) *Attorney, Agent, or Firm* — Morgan, Lewis & Bockius LLP

(57) ABSTRACT

Disclosed are an apparatus and a method for neural network learning using a synapse based on multiple elements. A neural network learning apparatus using a synapse based on multiple elements according to an exemplary embodiment of the present disclosure includes a first synaptic unit including a plurality of first resistive elements to update a weight of a neural network based on a first precision and a second synaptic unit including a plurality of second resistive elements to update the weight of the neural network with a precision higher than the first precision.

22 Claims, 13 Drawing Sheets

(56) References Cited

OTHER PUBLICATIONS

Chi, Ping et al; “PRIME: A Novel Processing-in-memory Architecture for Neural Network Computation in ReRAM-based Main Memory”; 2016; ACM/IEEE 43rd Annual International Symposium on Computer Architecture; 27-39 (Year: 2016).*

Brownlee, Jason; “Use Early Stopping to Halt the Training of Neural Networks At the Right Time”; 2020; Machine Learning Mastery [online]; Retreived from Internet <https://machinelearningmastery.com/how-to-stop-training-deep-neural-networks-at-the-right-time-using-early-stopping/> (Year: 2020).*

Liu, Rui et al.; “Analyzing Inference Robustness of RRAM Synaptic Array in Low-Precision Neural Network”; 2017; IEEE 2017 47th European Solid-State Device Research Conference (ESSDERC); 1-4 (Year: 2017).*

Shukla, Aditya; “A case for multiple and parallel RRAMs as synaptic model for training SNNs”; 2018; IEEE 2018 International Joint Conference on Neural Networks (IJCNN); 1-8 (Year: 2018).*

Jiang, Hongwu et al.; “MINT: Mixed-precision RRAM-based IN-memory Training Architecture”; Oct. 2020; 2020 IEEE International Symposium on Circuits and Systems (ISCAS); 1-5 (Year: 2020).*

L. Song, et al. “PipeLayer: A Pipelined ReRAM-Based Accelerator for Deep Learning”. 2017 IEEE International Symposium on High Performance Computer Architecture (HPCA). IEEE. (May 8, 2017), pp. 541-552.

S. R. Kulkami et al. “Neuromorphic Hardware Accelerator for SNN Inference based on STT-RAM Crossbar Arrays”. 2019 26th IEEE International Conference on Electronics, Circuits and Systems (ICECS). IEEE. (Jan. 23, 2020), pp. 438-441.

* cited by examiner

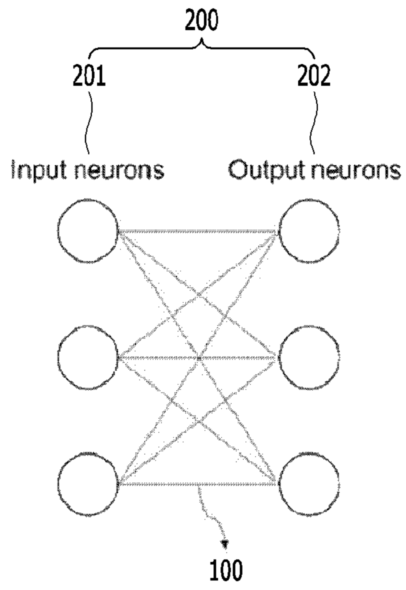
[FIG. 1A]
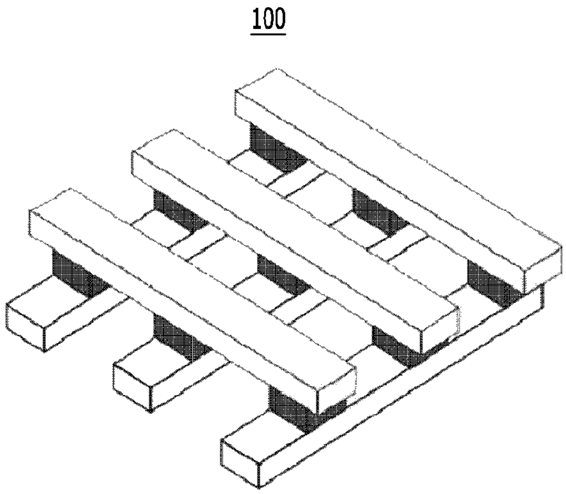
[FIG. 1B]

[FIG. 2A]
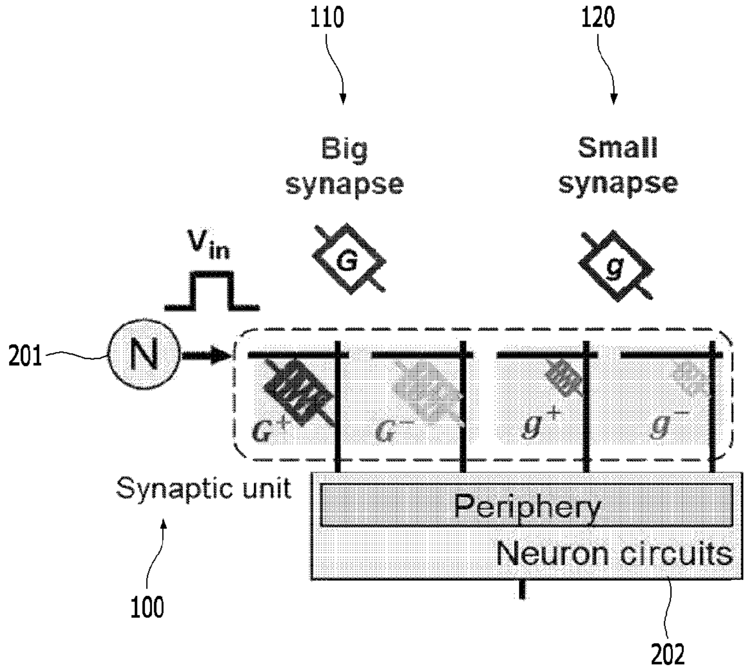

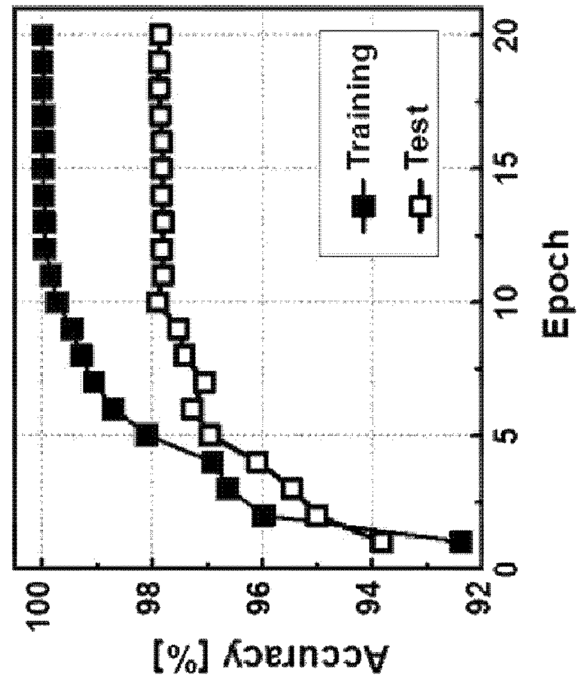
[FIG. 2C]
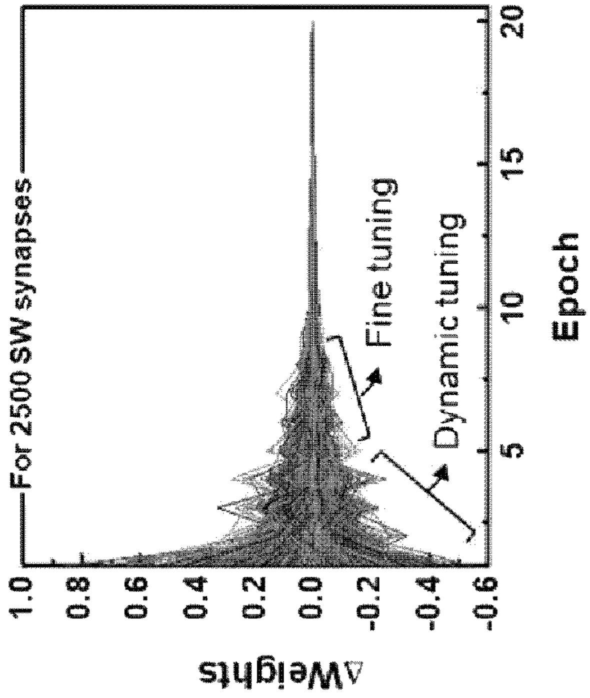
[FIG. 2B]

[FIG. 3A]
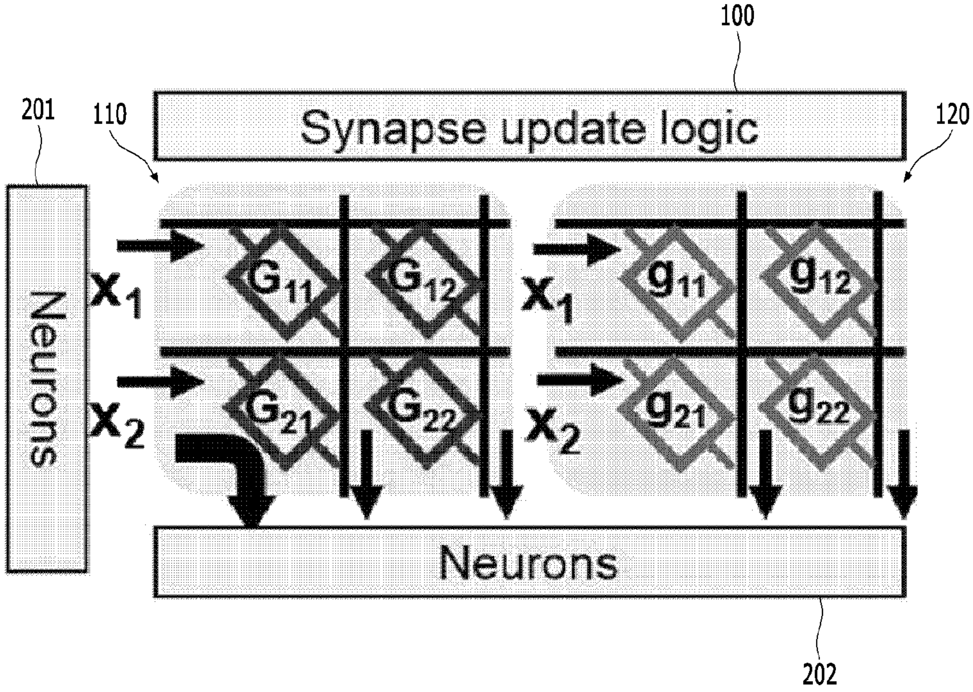

[FIG. 3B]
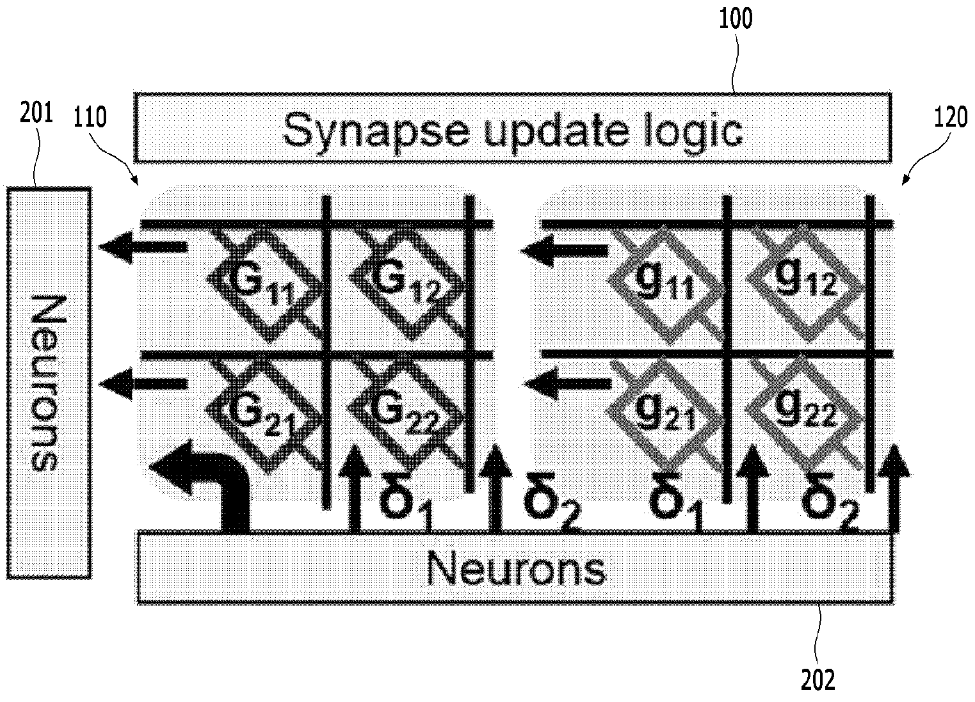

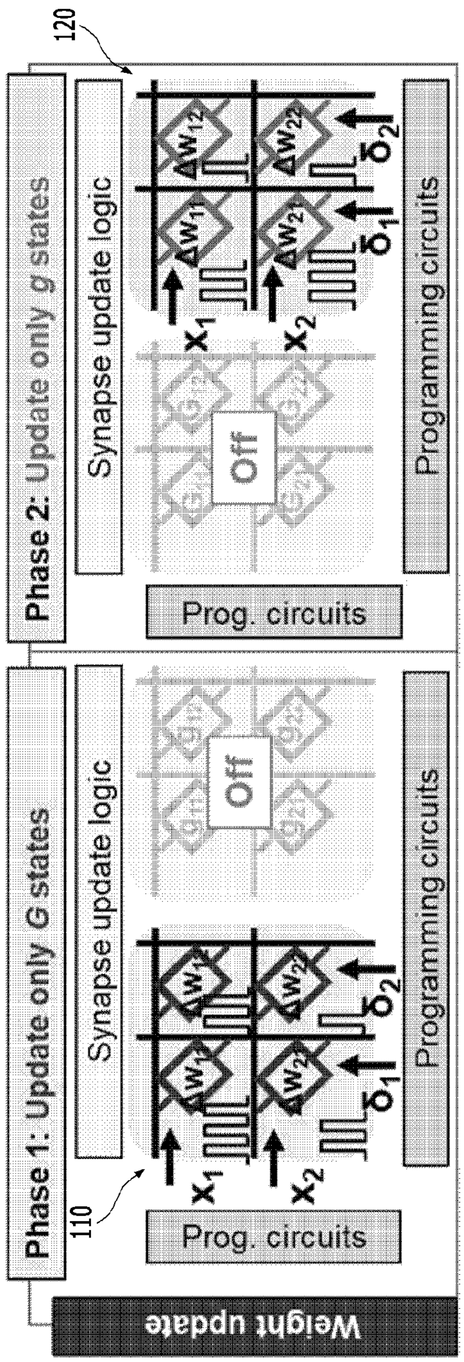
[FIG. 3C]

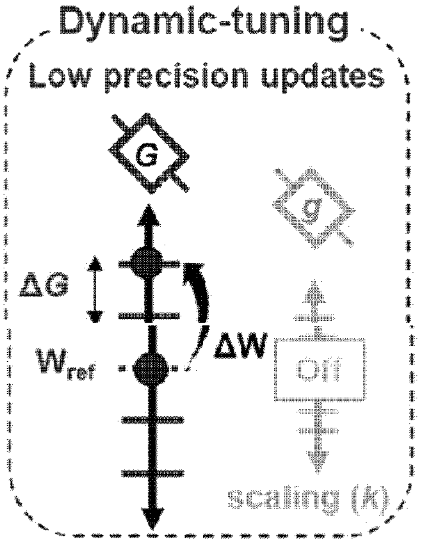
[FIG. 4A]
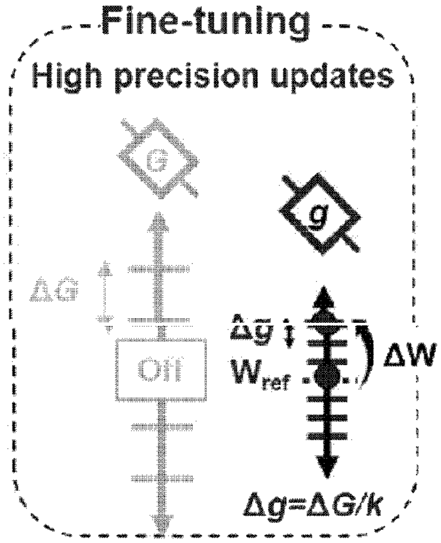
[FIG. 4B]

[FIG. 5A]
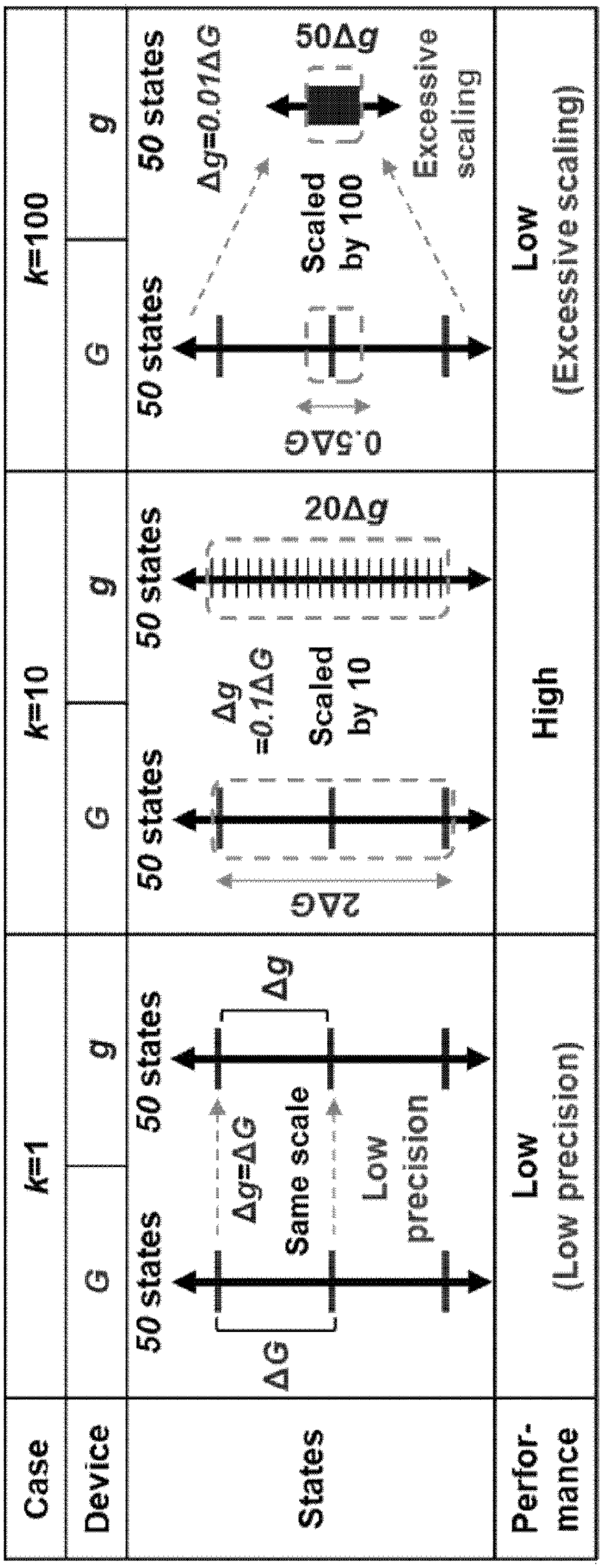

[FIG. 5B]
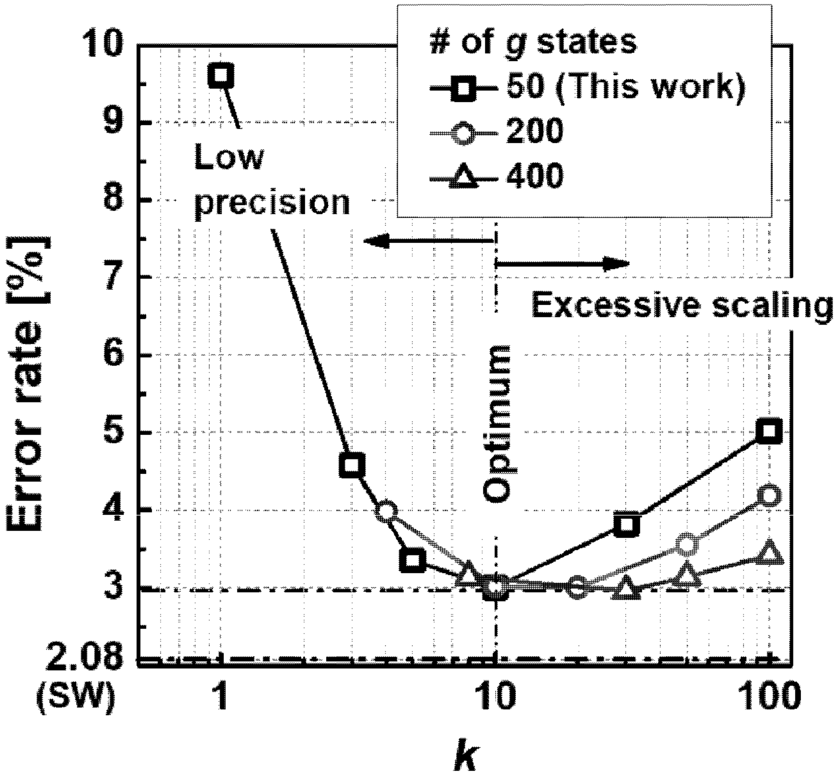

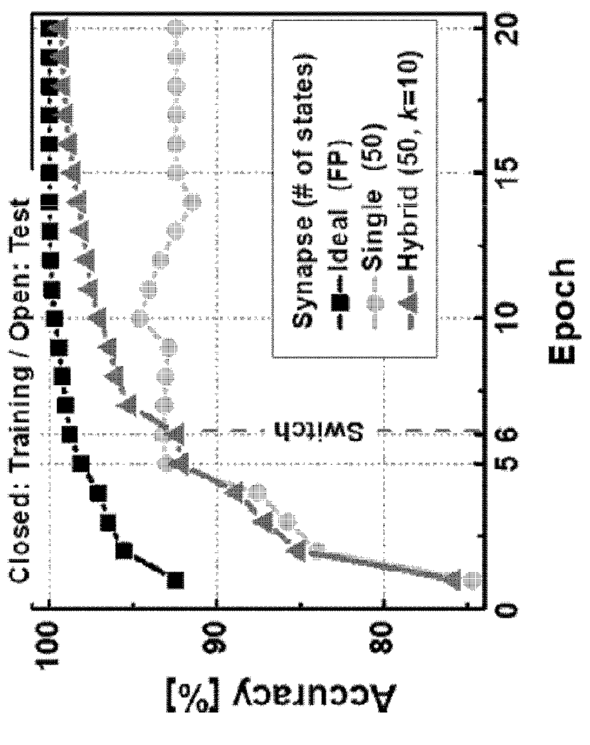
[FIG. 6A]
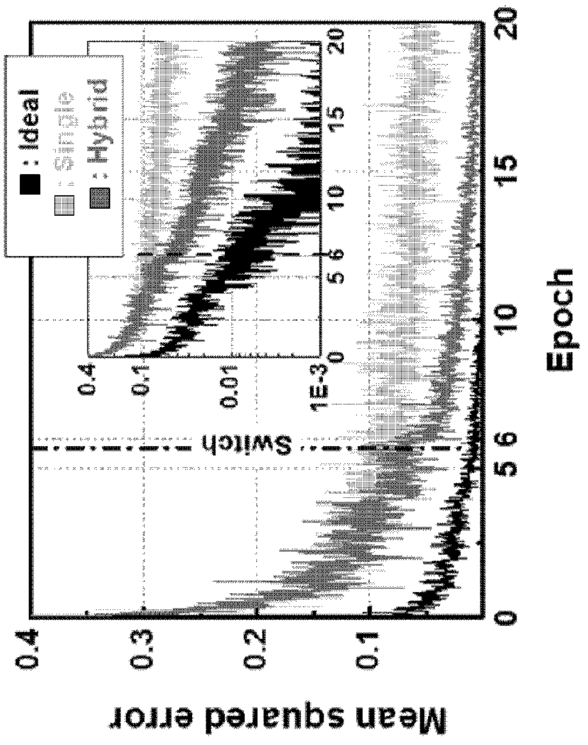
[FIG. 6B]

[FIG. 6C]
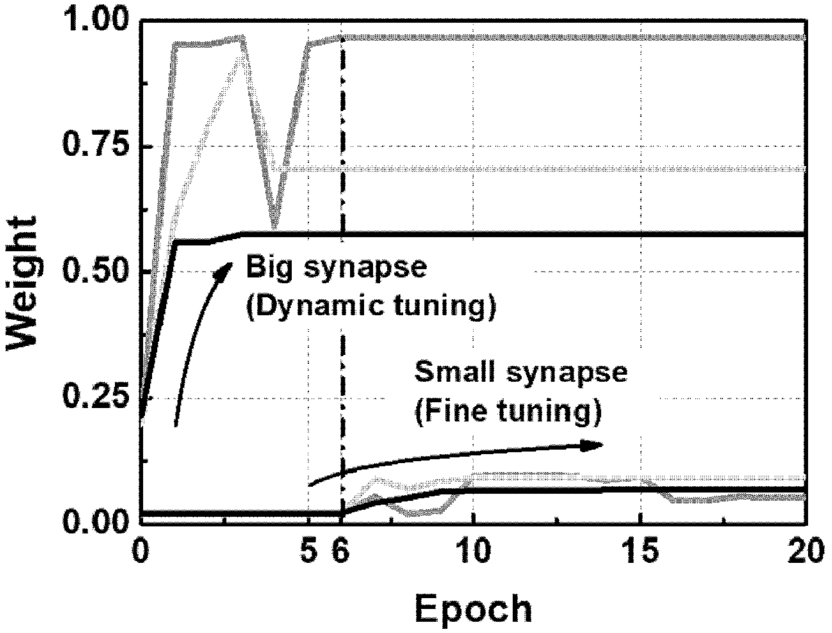

[FIG. 7]
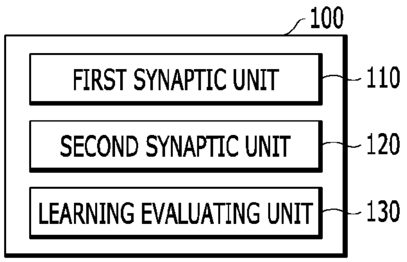

[FIG. 8]
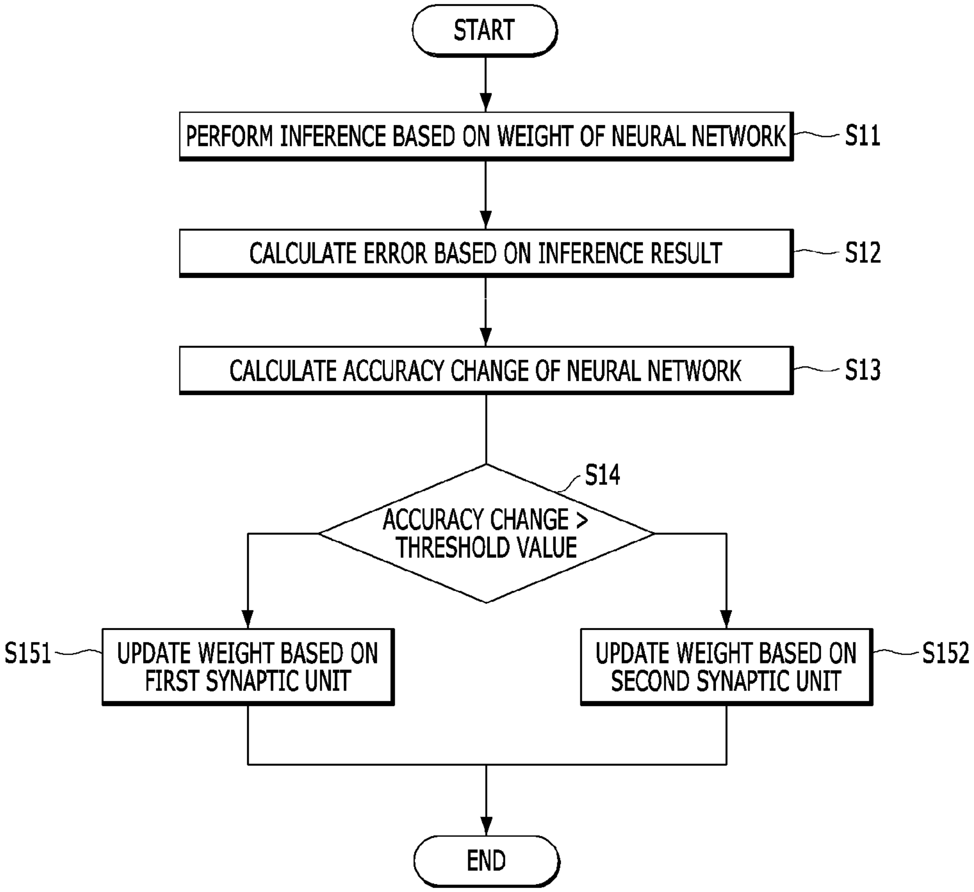

APPARATUS AND METHOD FOR NEURAL NETWORK LEARNING USING SYNAPSE BASED ON MULTI ELEMENT

CROSS-REFERENCE TO RELATED APPLICATIONS

This application claims the priority of Korean Patent Application No. 10-2021-0056015 filed on Apr. 29, 2021, in the Korean Intellectual Property Office, the disclosure of which is incorporated herein by reference.

BACKGROUND

Field

The present disclosure relates to an apparatus and a method for neural network learning using a synapse based on multiple elements, and more particularly, to a neural network learning acceleration technique using an RRAM-based hybrid synapse.

Description of the Related Art

The artificial intelligence (AI) technology has been widely spread in various fields such as computer vision, natural language recognition, and medical care. The development of the AI technology is achieved by the development of a deep learning algorithm, but a digital computing method of the related art based on a von Neumann architecture cannot withstand the size and the complexity of the neural network and computations which are consistently increasing so that there is a limitation in terms of the energy efficiency.

In the meantime, in order to overcome the increase in size and computational complexity of the neural networks, brain-inspired neuromorphic computing such as a hardware neural network (HNN) has been developed. Specifically, a resistive RAM (RRAM) stores multiple levels of weights as a conductance value to be utilized as a synaptic device. A parallel updating manner of such a resistive memory array has a potential to accelerate neural network learning together with vector matrix multiplication (VMM).

However, the resistive memory represents only a limited number of conductance states and in order to represent more weight bits through the resistive memory, in various studies of the related art, multiple cells are utilized for a synapse of the analog neuromorphic system. However, a plurality of devices is operated by one synapse so that it is not possible to fully apply the parallel updating manner of the related art. Further, the neuromorphic system needs to determine a device to be updated for each synapse and calculate an amount of updated weight so that consequently, excessive time and resources are required for the weight updating process of the synaptic unit architecture.

Accordingly, in order to quickly and accurately learn a hardware-based neural network, it is necessary to develop a technique of training a synaptic unit architecture using a parallel updating method without losing an amount of feedback information.

The background art of the present disclosure is disclosed in Korean Unexamined Patent Application Publication No. 10-2017-0080441.

SUMMARY

In order to solve the problems of the related art, an object of the present disclosure is to provide an apparatus and a method for neural network learning using a synapse based on multiple elements which update a weight of a neural network with a synaptic unit including a resistive element to selectively update only a specific synapse array in the unit to accelerate the learning of neuromorphic hardware and increase an accuracy.

In order to solve the problems of the related art, an object of the present disclosure is to achieve the training of a neural network with a high accuracy by utilizing a resistive element having a physical limit in terms of a precision of a conductance (conductivity) value as a synapse.

In order to solve the problems of the related art, an object of the present disclosure is to update a weight of a neural network with a synaptic unit including a resistive element to selectively update only a specific synapse array in the unit according to a learning progress level and a weight changing level to use a full parallel updating method.

However, objects to be achieved by various embodiments of the present disclosure are not limited to the technical objects as described above and other technical objects may be present.

As a technical means to achieve the above-described technical object, according to an aspect of the present disclosure, a neural network learning apparatus using a synapse based on multiple elements includes a first synaptic unit including a plurality of first resistive elements to update a weight of a neural network based on a first precision; and a second synaptic unit including a plurality of second resistive elements to update the weight of the neural network with a precision higher than the first precision.

Further, a conductance value of the first resistive element may be higher than a conductance value of the second resistive element.

Further, the weight may be selectively updated based on a learning progress level of the neural network based on the first synaptic unit or the second synaptic unit.

Further, the first synaptic unit may be relatively involved in an early part of the training of the neural network based on the learning progress level.

Further, the second synaptic unit may be relatively involved in a latter part of the training of the neural network based on the learning progress level.

Further, the neural network may be repeatedly trained as many as a plurality of predetermined epochs.

Further, the neural network learning apparatus using a synapse based on multiple elements according to the exemplary embodiment of the present disclosure may further include a learning evaluating unit which calculates a change in an accuracy of the neural network whenever any one epoch of the plurality of epochs is completed to evaluate the learning progress level.

Further, when the change in the accuracy evaluated by the learning evaluating unit is equal to or lower than a predetermined threshold value after updating the weight by the first synaptic unit by means of the any one epoch, the weight may be updated by the second synaptic unit in epochs after the any one epoch.

Further, a conductance value of the first resistive element may be obtained by multiplying the conductance value of the second resistive element by a predetermined gain factor.

Further, at least one of the plurality of first resistive elements and the plurality of second resistive elements may be provided as a crossbar array.

In the meantime, according to another aspect of the present disclosure, a neural network circuit using a synapse based on multiple elements may include a plurality of artificial neurons; and at least one synaptic unit including a plurality of first resistive elements to update a weight between the plurality of artificial neurons based on a first precision and a plurality of second resistive elements to update the weight with a precision higher than the first precision.

In the meantime, according to another aspect of the present disclosure, a neural network learning method using a synapse based on multiple elements may include inferring based on a weight of a neural network; calculating an error based on the inference result; and updating the weight based on the error.

Further, in the updating, the weight may be updated selectively using a first synaptic unit including a plurality of first resistive elements to update the weight based on a first precision and a second synaptic unit including a plurality of second resistive elements to update the weight with a precision higher than the first precision.

Further, in the updating, the first synaptic unit is used for relatively an early part of the training of the neural network based on the learning progress level of the neural network and the second synaptic unit is used for relatively a latter part of the training of the neural network based on the learning progress level.

Further, the neural network learning method may be repeated as many as a plurality of predetermined epochs.

Further, the neural network learning method using a synapse based on multiple elements according to the exemplary embodiment of the present disclosure may further include evaluating the learning progress level by calculating a change in an accuracy of the neural network whenever any one epoch of the plurality of epochs is completed.

Further, in the updating, when it is evaluated by the evaluating that the change in the accuracy is equal to or lower than a predetermined threshold value after updating the weight by the first synaptic unit by means of the any one epoch, the weight may be updated using the second synaptic unit in epochs after the any one epoch.

The above-described solving means are merely illustrative but should not be construed as limiting the present disclosure. In addition to the above-described embodiments, additional embodiments may be further provided in the drawings and the detailed description of the present disclosure.

According to the above-described solving means of the present disclosure, it is possible to provide an apparatus and a method for neural network learning using a synapse based on multiple elements which updates a weight of a neural network with a synaptic unit including a resistive element to selectively update only a specific synapse array in the unit to accelerate the learning of neuromorphic hardware and increase an accuracy.

According to the above-described solving means of the present disclosure, a resistive element having a physical limitation in terms of a precision of the conductance value (conductivity) is utilized as a synapse to achieve the learning of the neural network with a high accuracy.

According to the above-described solving means of the present disclosure, in the case of a single element, the high accuracy learning of the neural network hardware is achieved by using a resistive element having a physical limitation in terms of a precision of the conductance value (conductivity) as a synapse to apply the resistive memory array-based neural network and neuromorphic hardware to various artificial intelligence systems such as autonomous driving or image processing.

However, the effect which can be achieved by the present disclosure is not limited to the above-described effects, there may be other effects.

BRIEF DESCRIPTION OF THE DRAWINGS

The above and other aspects, features and other advantages of the present disclosure will be more clearly understood from the following detailed description taken in conjunction with the accompanying drawings, in which:

FIGS. 1A and 1B are schematic diagrams of a neural network circuit including a neural network learning apparatus using a synapse based on multiple elements according to an exemplary embodiment of the present disclosure;

FIG. 2A is a conceptual view for explaining a first synaptic unit and a second synaptic unit;

FIGS. 2B and 2C are views illustrating a training process of an ideal software network;

FIGS. 3A to 3C are views illustrating operations of a first synaptic unit and a second synaptic unit in an inference process, an error calculating process, and a weight updating process, respectively;

FIGS. 4A and 4B are conceptual views for explaining dynamic-tuning of a weight using a first synaptic unit and fine-tuning of a weight using a second synaptic unit;

FIGS. 5A and 5B are views for explaining a training performance change according to a change of a gain factor related to conductance values of a first resistive element and a second resistive element;

FIGS. 6A, 6B and 6C are graphs illustrating a training result of an experimental embodiment related to a neural network learning technique using a synapse based on multiple elements according to an exemplary embodiment of the present disclosure;

FIG. 7 is a schematic diagram of a neural network learning apparatus using a synapse based on multiple elements according to an exemplary embodiment of the present disclosure; and FIG. 8 is an operational flowchart of a neural network learning method using a synapse based on multiple elements according to an exemplary embodiment of the present disclosure.

DETAILED DESCRIPTION OF THE EMBODIMENT

Hereinafter, the present disclosure will be described more fully with reference to the accompanying drawings, in which exemplary embodiments of the present disclosure are shown. However, the present disclosure can be realized in various different forms, and is not limited to the embodiments described herein. Accordingly, in order to clearly explain the present disclosure in the drawings, portions not related to the description are omitted. Like reference numerals designate like elements throughout the specification.

Throughout this specification and the claims that follow, when it is described that an element is “coupled” to another element, the element may be “directly coupled” to the other element or “electrically coupled” or “indirectly coupled” to the other element through a third element.

Through the specification of the present disclosure, when one member is located “on”, “above”, “on an upper portion”, “below”, “under”, and “on a lower portion” of the other member, the member may be adjacent to the other member or a third member may be disposed between the above two members.

In the specification of the present disclosure, unless explicitly described to the contrary, the word "comprise" and variations such as "comprises" or "comprising", will be understood to imply the inclusion of stated elements but not the exclusion of any other elements.

The present disclosure relates to an apparatus and a method for neural network learning using a synapse based on multiple elements, and for example, relates to a neural network training acceleration technique using an RRAM-based hybrid synapse.

FIGS. 1A and 1B are schematic diagrams of a neural network circuit including a neural network learning apparatus using a synapse based on multiple elements according to an exemplary embodiment of the present disclosure.

Referring to FIGS. 1A and 1B, a neural network circuit according to an exemplary embodiment of the present disclosure may include an artificial neuron 200 and a synaptic unit 100. Here, the synaptic unit 100 may correspond to a neural network learning apparatus 100 using a synapse based on multiple elements according to an exemplary embodiment of the present disclosure (hereinafter, referred to as a neural network learning apparatus 100).

Specifically, referring to FIGS. 1A and 1B, the neural network circuit according to the exemplary embodiment of the present disclosure may include a plurality of artificial neurons 200 and at least one synaptic unit 100 which includes a plurality of first resistive elements to update a weight between the plurality of artificial neurons 200 based on a first precision and a plurality of second resistive elements to update the weight between the plurality of artificial neurons 200 with a precision higher than the first precision (for example, a second precision).

According to the exemplary embodiment of the present disclosure, the neural network circuit is a hardware neural network (HNN) and operates based on signal propagation and a neuronal signal may be mapped to a voltage value in a predetermined position in the neural network circuit.

In the meantime, referring to FIG. 1A, the plurality of artificial neurons 200 included in the neural network circuit may include an input side neuron 201 and an output side neuron 202 based on a signal propagation direction. The neural network learning apparatus 100 which is a synaptic unit 100 may be a set (array) of resistive elements which multiply a voltage signal transmitted from the input side neuron 201 between the input side neuron 201 and the output side neuron 202 by a conductance value according to the Ohm's law to transmit the value to the output side neuron 202. With regard to this, in the output side neuron 202, signals which are propagated by being multiplied by a connection weight by the synaptic unit 100 from at least one input side neuron 201 connected through the synaptic unit 100 may be accumulated by the Kirchhoff's Law. For reference, the matters about the operating method of the hardware neural network (HNN) are obvious to those skilled in the art so that a detailed description thereof will be omitted.

Further, referring to FIG. 1B, according to the exemplary embodiment of the present disclosure, the neural network learning apparatus 100 may be provided with a crossbar array. In other words, at least one of the plurality of first resistive elements and the plurality of second resistive elements included in the neural network learning apparatus 100 may include a resistive memory RRAM provided with a crossbar array.

Hereinafter, a hybrid synapse structure and a function of the neural network learning apparatus 100 will be described.

FIG. 2A is a conceptual view for explaining a first synaptic unit and a second synaptic unit.

Referring to FIG. 2A, the neural network learning apparatus 100 may include a first synaptic unit 110 including the plurality of first resistive elements to update a weight of the neural network based on the first precision and a second synaptic unit 120 including a plurality of second resistive elements to update the weight of the neural network with a precision higher than the first precision (for example, referred to as a second precision).

For reference, a neural network learning apparatus 100 including the first synaptic unit 110 and the second synaptic unit 120 corresponding to different precisions, respectively, will be described below. However, according to various Implementation embodiments of the present disclosure, the neural network learning apparatus 100 may also be implemented to include two or more synaptic units (for example, a first synaptic unit to a third synaptic unit) corresponding to respective precisions determined to have a plurality of different levels. In the meantime, with regard to the neural network learning apparatus 100 including a plurality of synaptic units, the "first synaptic unit 110" and the "second synaptic unit 120" may be understood to refer to any one synaptic unit and another synaptic unit, among the plurality of synaptic units.

Further, a conductance value of the first resistive element of the first synaptic unit 110 may be higher than a conductance value of the second resistive element of the second synaptic unit 120. With regard to the weight updated by the neural network learning apparatus 100 which is a synaptic unit 100, a conductance value of the resistive element may correspond to a connection intensity of the synapse. Accordingly, the first synaptic unit 110 may update the weight of the neural network by utilizing the plurality of resistive elements (first resistive elements) having a conductance value higher than that of the second synaptic unit 120 to update the weight to have a relatively large unit.

With regard to this, the conductance value of the first resistive element may be a value obtained by multiplying the conductance value of the second resistive element by a predetermined gain factor (k), which is represented by the following Equation 1.

$$g=G/k \qquad \text{[Equation 1]}$$

Here, G is a conductance value of the first resistive element, g is a conductance value of the second resistive element, and k is a gain factor.

In the meantime, according to the exemplary embodiment of the present disclosure, the weight of the neural network to be updated by the neural network learning apparatus 100 may be selectively updated based on the first synaptic unit 110 or the second synaptic unit 120, based on the learning progress level of the neural network.

FIGS. 2B and 2C are views illustrating a training process of an ideal software network.

Referring to FIGS. 2B and 2C, it is confirmed that the weight adjusting process by the synapse of the software network is mainly divided into a dynamic tuning step of roughly updating the weight and a fine tuning step of finely updating the weight with a high precision. It may be determined that the weight is roughly updated or finely updated, according to predetermined criteria.

With regard to this, the neural network learning apparatus 100 disclosed in the present disclosure includes a first synaptic unit 110 which is involved in the dynamic tuning step to roughly update (in other words, update at a low precision) the weight and a second synaptic unit 120 which is involved in the fine tuning step to relatively finely update (in other words, update at a high precision) the weight and adjusts a gain factor k between the resistive elements of the first synaptic unit 110 and the second synaptic unit 120 to set a precision difference (a magnification) of the first synaptic unit 110 and the second synaptic unit 120. Here, the larger the gain factor k, the higher the precision of the weight which is represented by being updated by the second synaptic unit 120.

In other words, a weight of a synaptic unit disposed in an i-th row and a j-th column among the plurality of synaptic units 100 included in the neural network learning apparatus 100 may be represented by the following Equation 2.

$$W_{ij} = (G_{ij}^{+} - G_{ij}^{-}) + (g_{ij}^{+} - g_{ij}^{-})$$

Here, signs +/− may indicate conductance values of the resistive element corresponding to a negative electrode/positive electrode.

In the meantime, the gain factor k between the resistive elements between the first synaptic unit 110 and the second synaptic unit 120 may be adjusted by applying scaling to an input voltage signal or adjusting a gain value of a peripheral circuit.

As another example, according to an exemplary embodiment of the present disclosure, the gain factor k between the resistive elements between the first synaptic unit 110 and the second synaptic unit 120 may be achieved by an area-dependent conductance scaling between the first resistive element and the second resistive element. The area-dependent conductance scaling method has an advantage in that an area occupied by each resistive element (device) is expanded without modifying an operating system to adjust a precision magnification. For example, it is understood that according to the area-dependent conductance scaling method, when k is 10, a device area of the second resistive element of the second synaptic unit 120 is reduced by 10 times as compared with the first resistive element of the first synaptic unit 110.

FIGS. 3A to 3C are views illustrating a first synaptic unit and a second synaptic unit in an inference process, an error calculating process, and a weight updating process.

Specifically, FIG. 3A illustrates a state of the neural network learning apparatus 100 in an inference process (feedforward) of the neural network, FIG. 3B illustrates a state of the neural network learning apparatus 100 in an error calculating process (backpropagation) of the neural network, and FIG. 3C illustrates a state of the neural network learning apparatus 100 in a weight updating process of the neural network.

Referring to FIGS. 3A and 3B, the neural network learning apparatus 100 may perform a vector-matrix operation by utilizing all the weights of the first synaptic unit 110 and the second synaptic unit 120 in the inference process and the error calculating process. Referring to FIG. 3C, the neural network learning apparatus 100 may update the weight by selectively utilizing the first synaptic unit 110 or the second synaptic unit 120 in the weight updating process.

With regard to this, the first synaptic unit 110 may be relatively involved in an early part of the training of the neural network based on the learning progress level of the neural network and the second synaptic unit 120 may be relatively involved in a latter part of the training of the neural network based on the learning progress level of the neural network. The early part of the training and the latter part of the training may be determined according to predetermined criteria. (for example, by 50% of a total process)

To be more specific, the neural network trained by the neural network learning apparatus 100 is characterized in that it is repeated as many as a plurality of predetermined epochs. The learning evaluating unit 130 may evaluate the learning progress level by calculating the change in the accuracy of the neural network whenever any one epoch of the plurality of epochs is completed.

With regard to this, when an accuracy change (improvement) level between the epochs of the neural network evaluated by the learning evaluating unit 130 is derived to be a predetermined threshold level or lower, a switch circuit, etc. turns off the first synaptic unit 110 and turns on the second synaptic unit 120 to perform the fine tuning for the subsequent epochs by utilizing the second synaptic unit 120.

In other words, according to the exemplary embodiment of the present disclosure, after updating a weight of the neural network by the first synaptic unit 110 by means of any one epoch, when the change in the accuracy evaluated by the learning evaluating unit 130 is equal to or lower than a predetermined threshold value (a threshold level), the neural network learning apparatus 100 may allow the second synaptic unit 120 to update the weight in epochs after the corresponding epoch (any one epoch described above).

As described above, when the neural network learning apparatus 100 trains the neural network by means of the synaptic unit configured by a plurality of synaptic units, a specific synaptic unit (for example, the first synaptic unit 110 or the second synaptic unit 120) among the plurality of synaptic units is selectively utilized to update the weight. Therefore, the parallel updating method of the related art can be applied so that the training of the neural network may be accurately and quickly accelerated as compared with the related art.

FIGS. 4A and 4B are conceptual views for explaining dynamic-tuning of a weight using a first synaptic unit and fine-tuning of a weight using a second synaptic unit.

Referring to FIGS. 4A and 4B, the neural network learning apparatus 100 disclosed in the present disclosure may achieve an improved training accuracy only with a simple switching logic by means of a hybrid synaptic unit including synapse parts having different precision levels while overcoming a limitation in that conductivity levels of individual resistive elements are restricted.

FIGS. 5A and 5B are views for explaining a training performance change according to a change of a gain factor related to conductance values of a first resistive element and a second resistive element.

Referring to FIGS. 5A and 5B, the gain factor k plays an important role in determining a performance of the neural network by adjusting a precision of updating the weight by the hybrid synapse disclosed in the present disclosure. In order to analyze an optimal value of the gain factor k, as a result of evaluating an error of the weight update with respect to different gain factors k, FIG. 5A illustrates relative precisions when gain factors k are 1, 10, and 100, respectively. When k is 1, the precision of the first synaptic unit 110 and the precision of the second synaptic unit 120 are equal to each other. When k is increased to 10, the precision of the second synaptic unit 120 is increased by 10 times as compared with the precision of the first synaptic unit 110 so that the second synaptic unit 120 may allow the weight to represent different states by 10 times of the first synaptic unit 110. As a result, the neural network is roughly trained by the first synaptic unit 110 and then precisely tuned 10 times or more by the second synaptic unit 120 to reduce $W_{error}$ more.

However, when k is excessively increased to 100, even though the epoch proceeds, the change of the updated weight is too small due to excessively scaled precision, so that the training performance of the neural network may be rather decreased.

With regard to this, FIG. 5B illustrates the change in the error rate of the neural network by a function of k and referring to FIG. 5B, the increase of the error rate due to the excessive scaling of k may be relieved as the number of states of the second synaptic unit 120 is increased.

Hereinafter, an operation flow of the present disclosure will be described in brief based on the above-detailed description.

FIGS. 6A, 6B and 6C are graphs illustrating a training result of an experimental embodiment related to a neural network learning technique using a synapse based on multiple elements according to an exemplary embodiment of the present disclosure.

Referring to FIG. 6A, it can be confirmed that a training accuracy of a floating point synapse (Ideal(FP)) is gradually increased to 99.98% by the fine tuning process, but the entire neural network is not converged to an optimal state by the training through the single synapse (Single) having a limited number of states. In contrast, it can be confirmed that according to the hybrid synapse-based learning technique (Hybrid) disclosed in the present disclosure, in a dynamic tuning state before being switched to fine tuning, the accuracy is maintained at an equal level to the single synapse implementation, but after being switched to the fine tuning, the accuracy is gradually increased, unlike the single synapse implementation.

Further, referring to FIG. 6B, it can be confirmed that a mean square error (MSE) of the neural network is significantly reduced after switching the synapse used to update the weight from the first synaptic unit 110 to the second synaptic unit 120.

Further, FIG. 6C illustrates time-sequentially a changing degree of various weights by the operations of each of the first synaptic unit 110 and the second synaptic unit 120. Referring to FIG. 6C, it can be confirmed that in epochs before Epoch 6 in which the first synaptic unit 110 is switched to the second synaptic unit 120, the weight is dynamically tuned by the first synaptic unit 110 and in epochs after Epoch 6, the weight is finely tuned by the second synaptic unit 120. With regard to this, referring to FIG. 6C, the first synaptic unit 110 may be referred to as a big synapse and the second synaptic unit 120 may be referred to as a small synapse.

FIG. 7 is a schematic diagram of a neural network learning apparatus using a synapse based on multiple elements according to an exemplary embodiment of the present disclosure.

Referring to FIG. 7, the neural network learning apparatus 100 may include a first synaptic unit 110, a second synaptic unit 120, and a learning evaluating unit 130.

Hereinafter, an operation flow of the present disclosure will be described in brief based on the above-detailed description.

FIG. 8 is an operational flowchart of a neural network learning method using a synapse based on multiple elements according to an exemplary embodiment of the present disclosure.

A neural network learning method using a synapse based on multiple elements illustrated in FIG. 8 may be performed by the neural network learning apparatus 100 which has described above. Therefore, even though some contents are omitted, the contents which have been described for the neural network learning apparatus 100 may be applied to the description of the neural network learning method using a synapse based on multiple elements in the same manner.

Referring to FIG. 8, in step S11, the neural network learning apparatus 100 may perform inference based on a weight of a neural network.

Next, in step S12, the neural network learning apparatus 100 may calculate an error based on an inference result of step S11.

Next, in step S13, the learning evaluating unit 130 may evaluate a learning progress level by calculating a change in an accuracy of the neural network.

Next, in step S14, the neural network learning apparatus 100 may compare the evaluated change in the accuracy with a predetermined threshold value (a threshold level).

If the change in the accuracy exceeds the threshold value as a determination result in step S14, in step S151, the neural network learning apparatus 100 may perform dynamic tuning to update a weight based on the first synaptic unit 110.

In contrast, if the change in the accuracy is below the threshold value as a determination result in step S14, in step S152, the neural network learning apparatus 100 may perform fine tuning to update a weight based on the second synaptic unit 120.

In other words, when the neural network learning apparatus 100 may update the weight of the neural network based on the calculated error by means of steps S151 to S152, the neural network learning apparatus selectively utilizes the first synaptic unit 110 or the second synaptic unit 120 based on the learning level of the neural network evaluated in step S13 to update the weight.

In the above-description, steps S11 to S152 may be further divided into additional steps or combined as smaller steps depending on an implementation embodiment of the present disclosure. Further, some steps may be omitted if necessary and the order of steps may be changed.

The neural network learning method using a synapse based on multiple elements according to the exemplary embodiment of the present invention may be implemented as program commands which may be executed by various computers to be recorded in a computer readable medium. The computer readable medium may include solely a program command, a data file, and a data structure or a combination thereof. The program command recorded in the medium may be specifically designed or constructed for the present disclosure or known to those skilled in the art of a computer software to be used. An example of the computer readable recording medium includes hardware devices specially formed to store and execute a program command such as magnetic media, such as a hard disk, a floppy disk, and a magnetic tape, optical media, such as a CD-ROM and a DVD, magneto-optical media, such as a floptical disk, and a ROM, a RAM, a flash memory. Examples of the program command include not only a machine language code which is created by a compiler but also a high level language code which may be executed by a computer using an interpreter. The hardware device may operate as one or more software modules in order to perform the operation of the present disclosure and vice versa.

Further, the above-described neural network learning method using a synapse based on multiple elements may also be implemented as a computer program or an application executed by a computer which is stored in a recording medium.

The above description of the present disclosure is illustrative only and it is understood by those skilled in the art that the present disclosure may be easily modified to another specific type without changing the technical spirit or an essential feature of the present disclosure. Thus, it is to be appreciated that the embodiments described above are intended to be illustrative in every sense, and not restrictive. For example, each component which is described as a singular form may be divided to be implemented and similarly, components which are described as a divided form may be combined to be implemented.

The scope of the present disclosure is represented by the claims to be described below rather than the detailed description, and it is to be interpreted that the meaning and scope of the claims and all the changes or modified forms derived from the equivalents thereof come within the scope of the present disclosure.

What is claimed is:

1. A neural network learning apparatus for a hardware neural network using a synapse based on multiple elements, comprising:

a first synaptic unit of the hardware neural network, the first synaptic unit including a plurality of first resistive memory (RRAM) elements to update a weight of the hardware neural network based on a first precision by adjusting conductance values of the plurality of first resistive memory elements;

a second synaptic unit of the hardware neural network, the second synaptic unit including a plurality of second resistive memory (RRAM) elements to update the weight of the hardware neural network by adjusting conductance values of the plurality of second resistive memory elements with a precision higher than the first precision, wherein the plurality of second resistive memory elements have a different physical limitation in terms of conductivity as compared to the plurality of first resistive memory elements; and a switching circuit configured to selectively activate one of the first synaptic unit and the second synaptic unit based on a learning progress level of the hardware neural network, wherein;

the learning progress level is evaluated based on a change in an accuracy of the hardware neural network, and the switching circuit is configured to turn off the first synaptic unit and turn on the second synaptic unit to update the weight using exclusively the second synaptic unit.

2. The neural network learning apparatus according to claim 1, wherein a conductance value of a resistive element of the plurality of first resistive memory elements is higher than a conductance value of a resistive element of the plurality of second resistive memory elements.

3. The neural network learning apparatus according to claim 2, wherein the weight is selectively updated based on the learning progress level of the neural network based on the first synaptic unit or the second synaptic unit.

4. The neural network learning apparatus according to claim 3, wherein the first synaptic unit is involved in a training of the neural network based on the learning progress level, earlier than the second synaptic unit is involved in a training of the neural network based on the learning progress level.

5. The neural network learning apparatus according to claim 3, wherein the neural network is repeatedly trained as many as a plurality of predetermined epochs and a learning evaluating unit which calculates a change in an accuracy of the neural network whenever any one epoch of the plurality of predetermined epochs is completed to evaluate the learning progress level is further included.

6. The neural network learning apparatus according to claim 5, wherein when the change in the accuracy evaluated by the learning evaluating unit is equal to or lower than a predetermined threshold value after updating the weight by the first synaptic unit by the any one epoch, the weight is updated by the second synaptic unit in epochs after the any one epoch.

7. The neural network learning apparatus according to claim 2, wherein the conductance value of the resistive element of the plurality of first resistive memory elements is obtained by multiplying the conductance value of the resistive element of the plurality of second resistive memory elements by a predetermined gain factor.

8. The neural network learning apparatus according to claim 1, wherein at least one of the plurality of first resistive memory elements and the plurality of second resistive memory elements is provided as a crossbar array.

9. A neural network circuit using a synapse based on multiple elements, comprising:

a plurality of artificial neurons;

at least one synaptic unit including a plurality of first resistive memory elements to update a weight between the plurality of artificial neurons by adjusting conductance values of the plurality of first resistive memory (RRAM) elements based on a first precision and a plurality of second resistive memory elements to update the weight by adjusting conductance values of the plurality of second resistive memory (RRAM) elements with a precision higher than the first precision, wherein the plurality of second resistive memory elements have a different physical limitation in terms of conductivity as compared to the plurality of first resistive memory elements; and a switching circuit configured to selectively activate one of the plurality of first resistive memory elements and the plurality of second resistive memory elements based on a learning progress level of the neural network circuit, wherein the learning progress level is evaluated based on a change in an accuracy of the neural network circuit, and wherein the switching circuit is configured to turn off the plurality of first resistive memory elements and turn on the plurality of second resistive memory elements to update the weight using exclusively the plurality of second resistive memory elements.

10. A neural network learning method for a hardware neural network using a synapse based on multiple elements, comprising:

inferring based on a weight of a neural network;

calculating an error based on an inference result; and updating the weight based on the error, wherein in the updating, the weight is updated selectively using a first synaptic unit including a plurality of first resistive memory elements to update the weight by adjusting conductance values of the plurality of first resistive memory (RRAM) elements based on a first precision and a second synaptic unit including a plurality of second resistive memory elements to update the weight by adjusting conductance values of the plurality of second resistive memory (RRAM) elements with a precision higher than the first precision, wherein the plurality of second resistive memory elements have a different physical limitation in terms of conductivity as compared to the plurality of first resistive memory elements, wherein the updating includes a switching operation that selectively activates one of the first synaptic unit and the second synaptic unit based on a learning progress level of the hardware neural network, wherein the learning progress level is evaluated based on a change in an accuracy of the hardware neural network, and wherein the switching operation turns off the first synaptic unit and turns on the second synaptic unit to update the weight using exclusively the second synaptic unit.

11. The neural network learning method according to claim 10, wherein a conductance value of a resistive element of the plurality of first resistive memory elements is higher than a conductance value of a resistive element of the plurality of second resistive memory elements.

12. The neural network learning method according to claim 11, wherein in the updating, the first synaptic unit is used for a training of the neural network based on the learning progress level of the neural network, earlier than the second synaptic unit is used for a training of the neural network based on the learning progress level.

13. The neural network learning method according to claim 12, wherein the neural network learning method is repeatedly performed as many as a plurality of predetermined epochs, and evaluating the learning progress level by calculating a change in an accuracy of the neural network whenever any one epoch of the plurality of predetermined epochs is completed is further included.

14. The neural network learning method according to claim 13, wherein when the change in the accuracy evaluated is equal to or lower than a predetermined threshold value after updating the weight by the first synaptic unit by the any one epoch, and in the updating, the weight is updated using the second synaptic unit in epochs after the any one epoch.

15. The neural network learning method according to claim 11, wherein the conductance value of the resistive element of the plurality of first resistive memory elements is obtained by multiplying the conductance value of the resistive element of the plurality of second resistive memory elements by a predetermined gain factor.

16. A neural network apparatus for a hardware neural network, comprising:

a first synaptic unit including a plurality of first weight elements for coarse tuning a weight of the hardware neural network by adjusting conductance values of the plurality of first weight elements;

a second synaptic unit including a plurality of second weight elements for fine tuning the weight by adjusting conductance values of the plurality of second weight elements, wherein the plurality of second weight elements have a different physical limitation in terms of conductivity as compared to the plurality of first weight elements; and a switching circuit configured to selectively activate one of the first synaptic unit and the second synaptic unit based on a learning progress level of the hardware neural network, wherein the learning progress level is evaluated based on a change in an accuracy of the hardware neural network, and wherein the switching circuit is configured to turn off the first synaptic unit and turn on the second synaptic unit to tune the weight using exclusively the second synaptic unit.

17. The neural network apparatus according to claim 16, wherein a value of the weight tuned coarsely is corresponding to a ratio of current to voltage provided to the plurality of first weight elements, and a value of the weight tuned finely is corresponding to a ratio of current to voltage provided to the plurality of second weight elements.

18. The neural network apparatus according to claim 16, wherein coarse tuning of the plurality of first weight elements is performed prior to fine tuning of the plurality of second weight elements.

19. The neural network apparatus according to claim 16, wherein tuning of the plurality of first weight elements and tuning of the plurality of second weight elements are performed in a learning process of the neural network apparatus.

20. The neural network apparatus according to claim 19, wherein the learning process is performed during a plurality of epochs, and the tuning of the plurality of second weight elements is performed when a change in accuracy of the neural network apparatus is less than or equal to a threshold value by performing the learning process during each of the plurality of epochs.

21. The neural network apparatus according to claim 16, wherein fine-tuned resolution of the plurality of second weight elements is higher than a coarsely-tuned resolution of the plurality of first weight elements.

22. The neural network apparatus according to claim 16, wherein the plurality of first weight elements are arranged in an array, and the plurality of second weight elements are arranged in an array.

* * * * *